(12) United States Patent
Boyapati et al.

(10) Patent No.: US 11,716,135 B2
(45) Date of Patent: Aug. 1, 2023

(54) SYSTEMS AND METHODS FOR GRANULAR USER EQUIPMENT LOCATION DETERMINATION USING QUANTUM COMPUTING

(71) Applicant: Verizon Patent and Licensing Inc., Basking Ridge, NJ (US)

(72) Inventors: Vamsi Krishna Boyapati, Metairie, LA (US); Kishore K. Guntuku, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/664,441

(22) Filed: May 23, 2022

(65) Prior Publication Data

US 2022/0286197 A1 Sep. 8, 2022

Related U.S. Application Data

(63) Continuation of application No. 17/159,942, filed on Jan. 27, 2021, now Pat. No. 11,368,211.

(51) Int. Cl.
| | |
|---|---|
| *H04B 7/17* | (2006.01) |
| *G06N 10/00* | (2022.01) |
| *H04B 7/06* | (2006.01) |
| *H04W 74/00* | (2009.01) |
| *H04W 88/16* | (2009.01) |

(52) U.S. Cl.
CPC ............ *H04B 7/17* (2013.01); *G06N 10/00* (2019.01); *H04B 7/0617* (2013.01); *H04W 74/002* (2013.01); *H04W 88/16* (2013.01)

(58) Field of Classification Search
CPC ........ H04B 7/17; H04B 7/0617; G06N 10/00; G06N 10/40; G06N 10/60; H04W 74/002; H04W 88/16
See application file for complete search history.

(56) References Cited

U.S. PATENT DOCUMENTS

| | | |
|---|---|---|
| 2015/0094100 A1 | 4/2015 | Opshaug et al. |
| 2016/0088585 A1 | 3/2016 | Garg |
| 2017/0041823 A1 | 2/2017 | Xie et al. |
| 2017/0155441 A1* | 6/2017 | Lee .......................... H04B 7/04 |
| 2017/0306743 A1 | 10/2017 | DiFoggio et al. |

* cited by examiner

*Primary Examiner* — Fred A Casca

(57) ABSTRACT

Embodiments described herein provide for the granular network-based detection of UE location in a RAN that includes one or more mobile base stations using quantum computing. Mobile base stations may be, for example, affixed on vehicles (e.g., cars, trucks, drones, etc.), may be implemented by other UEs, and/or may otherwise be non-stationary. In contrast, fixed base stations may be mounted to towers, buildings, or other types of permanent or semi-permanent installations. Quantum computing techniques, as described herein, may aid in the precise determination of UE location using triangulation techniques and/or other network-based location techniques. Further, in RANs that include mobile base stations, the locations of both the UE and a reference point may change relatively rapidly. The use of quantum computing, as described herein, may aid in the fast and precise determination of UE location in situations where mobile base stations and/or UEs are moving rapidly.

20 Claims, 9 Drawing Sheets ed States Patent US 11,716,135 B2

SYSTEMS AND METHODS FOR GRANULAR USER EQUIPMENT LOCATION DETERMINATION USING QUANTUM COMPUTING

CROSS-REFERENCE TO RELATED APPLICATION

This Application is a Continuation of U.S. patent application Ser. No. 17/159,942; flied on Jan. 27, 2021, titled "SYSTEMS AND METHODS FOR GRANULAR USER EQUIPMENT LOCATION DETERMINATION USING QUANTUM COMPUTING," the contents of which are herein incorporated by reference in their entirety.

BACKGROUND

Wireless networks may provide location-based services to user equipment ("UE"), such as mobile telephones or other wireless communication devices. In order to provide such services, base stations and/or other elements of radio access networks ("RANs") may receive or determine UE location information. For example, a network may perform a triangulation process, in which multiple reference signals are sent to a UE, and a location of the UE is determined based on measurements associated with the reference signals.

DETAILED DESCRIPTION OF EXAMPLE EMBODIMENTS

The following detailed description refers to the accompanying drawings. The same reference numbers in different drawings may identify the same or similar elements.

Embodiments described herein provide for the granular network-based detection of UE location in a RAN that includes one or more mobile base stations using quantum computing. Mobile base stations may be, for example, affixed on vehicles (e.g., cars, trucks, drones, etc.), may be implemented by other UEs, and/or may otherwise be non-stationary. In contrast, fixed base stations may be mounted to towers, buildings, or other types of permanent or semi-permanent installations.

Quantum computing techniques, as described herein, may aid in the precise determination of UE location using triangulation techniques and/or other network-based location techniques. Further, in RANs that include mobile base stations, the locations of both the UE and reference point (e.g., mobile base station) from which a reference signal is sent to the UE, may change relatively rapidly. The use of quantum computing, as described herein, may aid in the fast and precise determination of UE location in situations where mobile base stations and/or UEs are moving rapidly.

Quantum bits generated and/or utilized by superconducting quantum computers can compute complex computations on multi-dimensional data (e.g., more efficiently and/or quickly than computing devices that do not use quantum computing techniques). Embodiments that determine a precise location of a UE in relation to a mobile base station may compute a relative distance along with relative velocity in addition to several other factors such as temporal parameters (e.g., attributes of a given location that may vary with time, such as local particulate matter ("PM2.5"), humidity, temperature, vehicle density, etc.), spatial parameters (e.g., attributes of a given location that may remain the same over time, such as concrete density signatures, topographical features, etc.), and/or other parameters. Some embodiments may use quantum computing techniques to rapidly generate computational results in the form of traffic based network demand coefficients, weather based network demand coefficients, particulate matter based demand coefficients, Internet of Things ("IoT") device density based demand coefficients and urban architectural based demand coefficients to precisely locate UEs and optimize network parameters based on UE locations (e.g., by modifying beamforming parameters, handover thresholds, and/or other network parameters).

Figure 1:
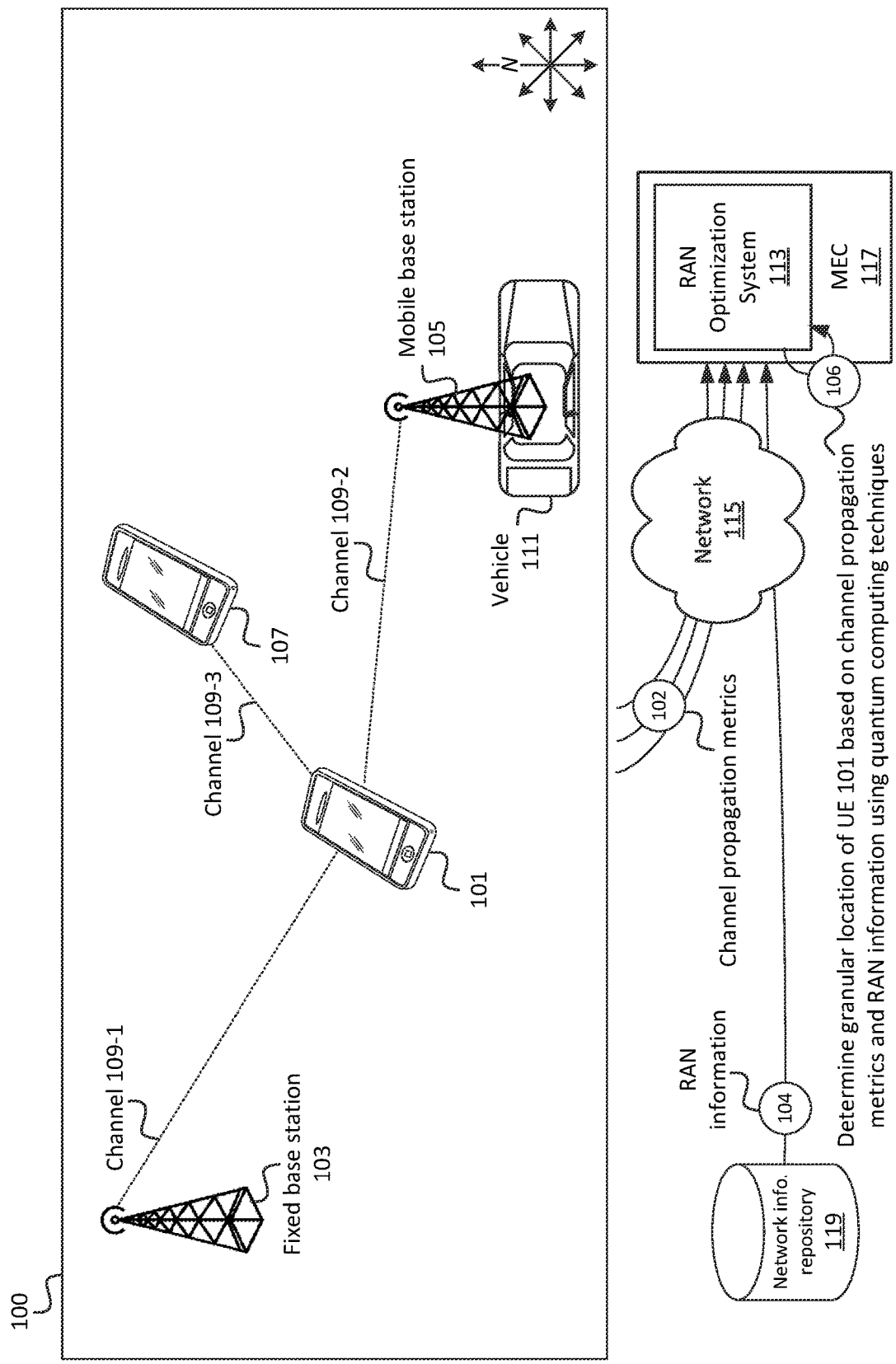
FIG. 1 illustrates an example overview of one or more embodiments described herein, in which quantum computing techniques may be used to determine a granular location of a UE connected to a RAN that includes stationary and mobile base stations.

As shown in FIG. 1, for example, region 100 may include UE 101, fixed base station 103, mobile base station 105, and UE 107. UE 101 may be, for example, a mobile telephone, tablet computer, and/or other type of wireless communication device. For example, UE 101 may be capable of communicating with fixed base station 103 and mobile base station 105 via a Long-Term Evolution ("LTE") radio access technology ("RAT"), a 5G RAT, and/or some other type of RAT. For example, channels 109 may represent radio frequency ("RF") signals sent to and/or from respective base stations and UE 101. For example, channel 109-1 may be a channel between fixed base station 103 and UE 101, and channel 109-2 may be a channel between mobile base station 105 and UE 101.

Mobile base station 105 may be "mobile" in that mobile base station 105 is not permanently affixed to a given location. For example, mobile base station 105 may be "mobile" in that mobile base station 105 is mounted to a vehicle, such as vehicle 111. In this example, vehicle 111 is a car. In practice, vehicle 111 may be another type of vehicle, such as a truck, a drone, etc.

In some embodiments, UE 107 may serve as a base station with respect to UE 101. For example, in some embodiments, UE 107 may be a "repeater," a "relay," and/or may otherwise serve as a wireless interface between UE 101 and one or more other base stations (e.g., fixed base station 103, mobile base station 105, and/or some other base station of a wireless network that serves region 100). Channel 109-3 may be a channel between UE 101 and UE 107. While not explicitly shown here, UE 107 may be associated with a channel with fixed base station 103, mobile base station 105, and/or one or more other base stations.

As further shown in FIG. 1, RAN Optimization System ("ROS") 113 may receive (at 102) channel propagation metrics associated with UE 101 (e.g., associated with channels 109-1, 109-2, and 109-3). For example, ROS 113 may receive such metrics via network 115, which may include a core of a wireless network to which base stations 103 and/or 105 are connected. In some embodiments, ROS 113 may receive the channel propagation metrics from UE 101, fixed base station 103, mobile base station 105, UE 107, a mobility management system (e.g., a Mobility Management Entity ("MME"), an Access and Mobility Management Function ("AMF"), and/or some other device or system of a wireless network that performs operations related to intra-RAN or inter-RAN mobility for one or more UEs), and/or some other device or system.

As shown, ROS 113 may be implemented by, and/or may be communicatively coupled to, Multi-Access/Mobile Edge Computing ("MEC") device 117, referred to sometimes herein simply as ("MEC 117"). For example, MEC 117 may be implemented at one or more network "edges," which may correspond to locations that are geographically closer to, and/or located within, region 100 than locations at which one or more other elements of network 115 are implemented. In some embodiments, traffic sent to and/or from MEC 117 (e.g., to and/or from UE 101, fixed base station 103, mobile base station 105, UE 107, etc.) may be sent and/or received without traversing a core network (e.g., an Evolved Packet Core ("EPC"), a Fifth Generation Core ("5GC"), or some other type of core network).

The channel propagation metrics (received at 102) may include information describing attributes of channels 109-1, 109-2, and/or 109-3. Such attributes may include a signal propagation delay associated with signals (e.g., reference signals or other signals) sent to UE 101 from fixed base station 103, mobile base station 105, and/or UE 107. Signal propagation delay may indicate, for example, the amount of time elapsed between the transmission of a given RF signal or set of RF signals from a given base station (e.g., base station 103 and/or base station 105) or UE (e.g., UE 107) to UE 101. In some embodiments, such RF signals may include a reference signal, a pilot signal, a Master Information Block ("MIB"), a System Information Block ("SIB"), or the like. In some embodiments, respective RF signals may include information indicating a time at which such RF signals were output from a given base station, and UE 101 may determine the propagation delay based on a time at which such RF signals were received by UE 101 and further based on the times at which such RF signals were output from the given base station.

In some embodiments, in addition to channel propagation metrics, ROS 113 may determine and/or receive one or more other attributes of channels 109-1, 109-2, and/or 109-3. Such attributes may include, and/or may be based on, measured or calculated network quality or performance metrics, such as signal to noise ratio ("SNR") metrics, Signal-to-Interference-and-Noise-Ratio ("SINR") metrics, Received Signal Strength Indicator ("RSSI") metrics, Reference Signal Receive Power ("RSRP") metrics, Channel Quality Indicator ("CQI") metrics, and/or other measures of channel or signal quality. In some embodiments, such attributes may include and/or maybe based on measures of traffic performance, such as throughput, latency, jitter, packet error rate, packet loss rate, and/or other suitable metrics or values.

ROS 113 may further receive (at 104) RAN information, which may include attributes of fixed base station 103, mobile base station 105, UE 107, and/or other attributes. In some embodiments, ROS 113 may receive (at 104) the RAN information from network information repository 119, which may include, may be implemented by, and/or may be communicatively coupled to a Network Repository Function ("NRF") and/or some other device or system of a wireless network that performs operations related to the maintaining and/or providing of information indicating deployed network elements associated with the wireless network.

For example, the received RAN information may indicate whether respective base stations are fixed or mobile base stations, may include location information associated with base stations and/or UEs (e.g., latitude and longitude coordinates, Global Positioning System ("GPS") coordinates, and/or other suitable location information), RATs implemented by respective base stations, load and/or capacity information associated with respective base stations (e.g., amount of available and/or used RF resources, such as Physical Resource Blocks ("PRBs")), beamforming attributes (e.g., azimuth angle, tilt angle, beam width, and/or other attributes of one or more antennas or beams), and/or other suitable attributes.

Based on the received channel propagation metrics and/or RAN information, ROS 113 may use quantum computing to determine a granular location of UE 101. For example, some embodiments may use several factors in addition to channel propagation metrics to precisely locate UE 101 and a mobile transmitter and/or reference point (e.g., mobile base station 105, UE 107, etc.). Neural networks and/or other suitable techniques may be used in some embodiments. In some embodiments, some embodiments may use metrics such as weather (e.g., humidity, temperature, or the like), PM2.5 information, vehicular traffic information (e.g., vehicular average speeds, vehicular density, etc.), concrete density metrics, green canopy density metrics, IoT density metrics, and/or other metrics. Some embodiments may ingest such metrics into a data lake environment to prepare for quantum processing.

The processed data may have specific geographical signatures based on performing Kalman filtering and/or other suitable techniques on one or more linear quadratic estimation models developed over time, which may include statistical noise and other inaccuracies, and may produce estimates of unknown variables that tend to be more accurate than those based on independent measurements. In some embodiments, locational signatures may be pipelined to baseline quantum optimization algorithm. In some embodiments, a different pipeline may ingest the baseline quantum metrics such as coherence, spin state location, shimming base, intracavity field parameters, and/or other quantum computing parameters. The baseline quantum metrics along with the local signatures mentioned above may be ingested to a neural network (e.g., using non-quantum computing techniques, in some embodiments) to rapidly optimize the quantum control trajectory for optimal RF pulse sequences in a superconducting quantum computer. The combination of the local signatures along with the quantum baseline metrics optimized using the neural network may generate high fidelity quantum bits for instantaneous calculations of UE location in real time or near-real time. The algorithms used to locate the UE with high granularity include multi-layer, multi-factorial quantum deep neural networks for absolute geo-localization, random forest methods for relative distance bucketing, and/or other suitable techniques. A combination of the absolute locations and relative (e.g., relative to a mobile base station) location of the UE may be pipelined to a beamforming optimization process, MIMO configuration modification, or other network parameter modification as discussed below.

Figure 2:
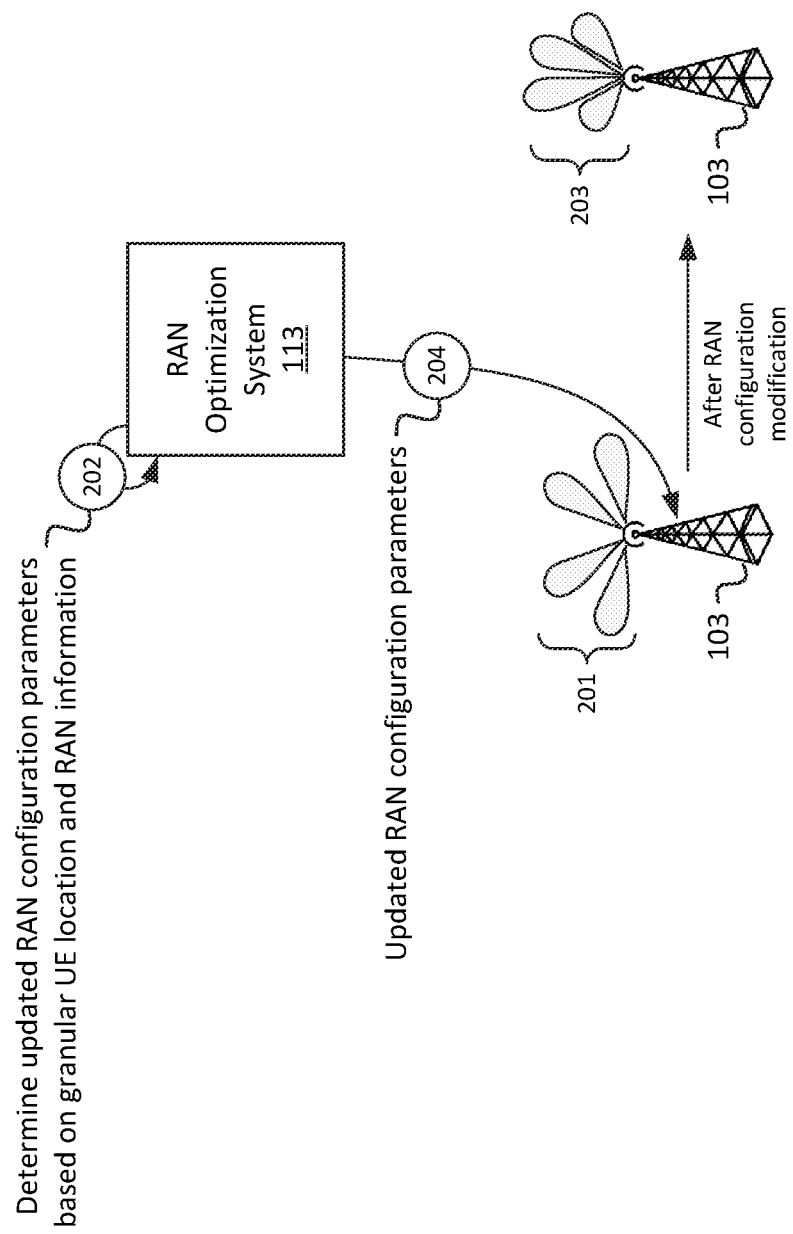
FIG. 2 illustrates an example of a modification of RAN configuration parameters based on granular UE location information determined using quantum computing techniques, in accordance with some embodiments.

As shown in FIG. 2, once ROS 113 determines (at 202) precise granular locations for UE 101 (e.g., using quantum computing techniques, as described above), ROS 113 may provide (at 204) updated RAN configuration parameters to fixed base station 103 and/or one or more other device or systems associated with a RAN serving region 100. For example, prior to receiving (at 204) updated RAN configuration parameters, fixed base station 103 may implement a first beam configuration 201, which may include a particular set of parameters for antenna azimuth angle and/or tilt angle, beam width, antenna power, MIMO parameters, and/or other beamforming parameters associated with fixed base station 103. After receiving and implementing the updated RAN configuration parameters, fixed base station 103 may implement a second beam configuration 203, which may include a different set of parameters for antenna azimuth angle and/or tilt angle, beam width, antenna power, MIMO parameters, and/or other beamforming parameters associated with fixed base station 103.

For example, ROS 113 may use quantum computing techniques, as discussed above, to determine a location at which UE 101 and/or a set of UEs (e.g., a set of UEs including 101) is located and/or is predicted to be located, and beam configuration 203 may be determined in order to increase channel quality between fixed base station 103 and UE 101 based on the determined location. Such increase in channel quality may include, for example, increasing a coverage area associated with fixed base station 103, increasing an amount of RF resources dedicated to the location of UE 101, and/or other suitable modifications to enhance Quality of Service ("QoS") metrics associated with UE 101.

Figure 3:
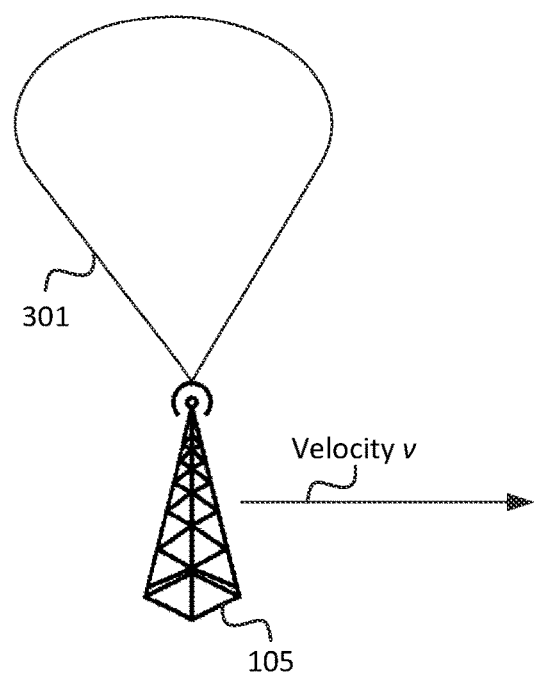
FIG. 3 illustrates an example coverage area associated with a base station of a RAN.
Figure 4:
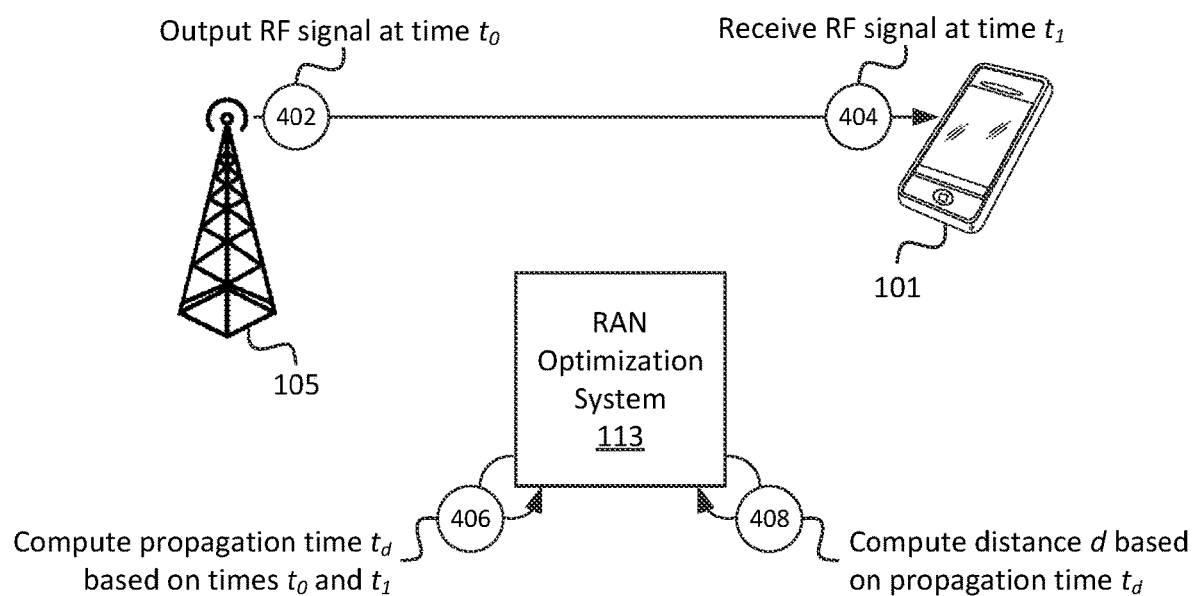
FIG. 4 illustrates an example determination of UE distance from a base station based on signal propagation metrics associated with a channel between the UE and the base station.
Figure 5:
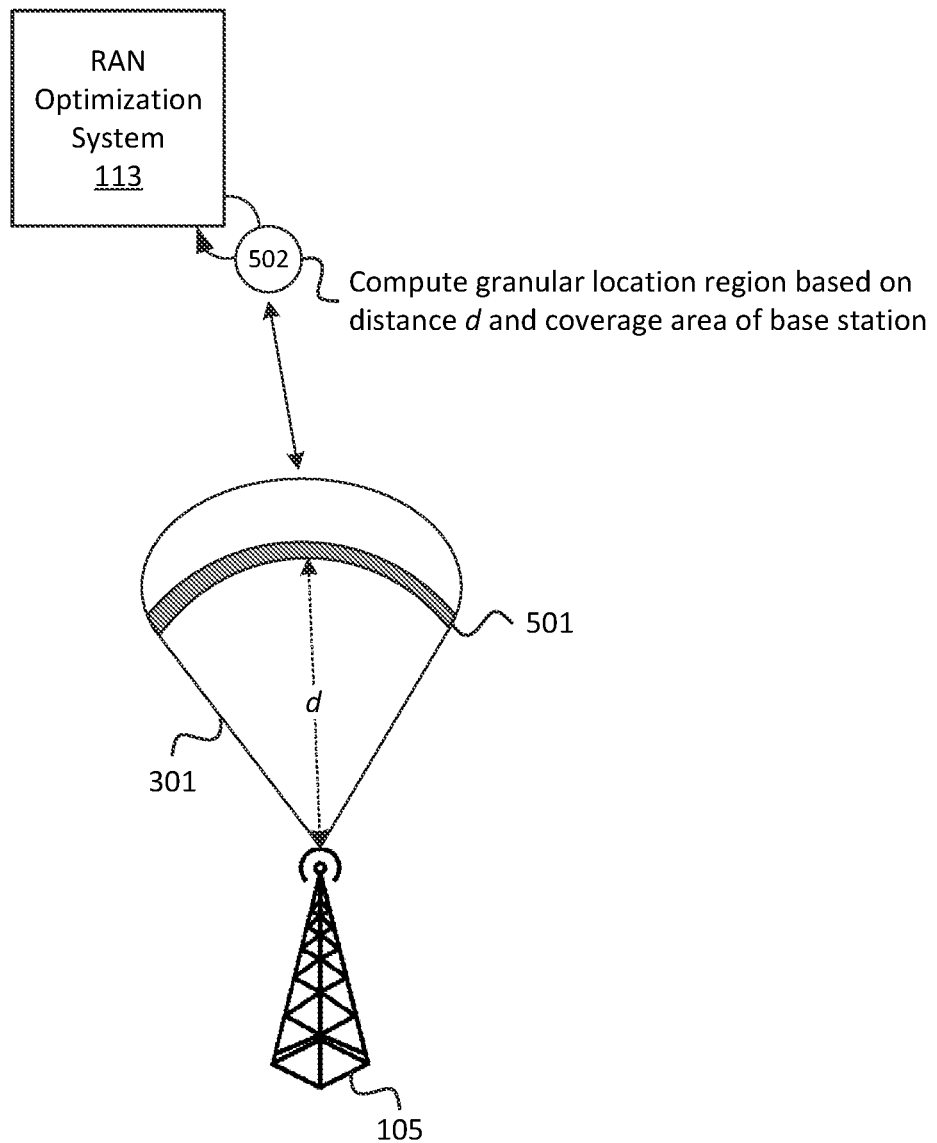
FIG. 5 illustrates a determination of a particular region, within a coverage area, in which a UE is located based on signal propagation metrics.

FIGS. 3-5 illustrate the example determination of a region within a coverage area of a base station, which may be determined as part of an ultimate determination of a granular location of UE 101, which may be determined using quantum computing techniques described herein or other suitable techniques. The examples of FIGS. 3-5 are presented in the context of mobile base station 105. In some embodiments, similar concepts may apply to fixed base station 103, UE 107, and/or other wireless infrastructure elements located in or serving region 100.

As shown in FIG. 3, for example, mobile base station 105 may be associated with coverage area 301. While coverage area 301 is represented here as a particular shape or polygon, in some embodiments, coverage area 301 may be represented by different shapes or polygons, and/or may include multiple regions. As further shown, mobile base station 105 may be associated with a particular velocity v, which may indicate a speed and/or direction associated with mobile base station 105. Coverage area 301 and velocity v associated with mobile base station 105 may be maintained and/or provided (e.g., to ROS 113) by network information repository 119, mobile base station 105, and/or some other device or system.

As shown in FIG. 4, mobile base station 105 may output (at 402) an RF signal, such as a reference signal or some other signal, to UE 101 at a first time $t_0$. As further shown, UE 101 may receive (at 404) the RF signal from mobile base station 105 at a second time $t_1$. ROS 113 may compute (at 406) a propagation time $t_d$ based on times $t_0$ and $t_1$. For example, time $t_d$ may be computed based on a difference between times $t_0$ and $t_1$, and/or some other suitable operation. In some embodiments, ROS 113 may compute a distance d between UE 101 and mobile base station 105 based on the computed propagation time $t_d$.

In some embodiments, computing (at 408) the distance d may be based on the propagation time $t_d$ and the velocity v associated with mobile base station 105. As discussed below, in some embodiments, the distance d may be used to compute beamforming parameters. For example, the distance between a moving UE 101 and a moving base station (e.g., mobile base station 105, UE 107, etc.) may not remain consistent in different geographic and traffic conditions. Factors such as particulate matter may be factored in to calculate the effective distance d. The use of quantum AI and one or more algorithms discussed above to obtain relative distance and absolute distance parameters may provide for the granular location determination of UE 101.

As shown in FIG. 5, once ROS 113 has computed distance d, ROS 113 may compute (at 502) a granular location region based on the computed distance d and based on coverage area 301. For example, as shown, granular location region 501 may be a particular portion of coverage area 301, that is located at or about distance d from a location of mobile base station 105. In some embodiments, consistent quantum-based Kalman filtering-based optimization may provide granularity in the relative distance evaluation. In some embodiments, the Kalman filtering may factor in both upsampled time data (e.g., daily, hourly, etc.) and downsampled (e.g., yearly, monthly, etc.) of traffic-based network demand coefficients, weather-based network demand coefficients, particulate matter-based demand coefficients, IoT device density-based demand coefficients, urban architectural-based demand coefficients, or other coefficients. In some embodiments, a quantum computer may be provided with data processed from multiple sources that may provide information pertaining to weather, emergency events, vehicular traffic data, and/or other data, that may be fed into quantum AI algorithms, to determine the locations of UE 101 and/or one or more mobile base stations. The localization information from the quantum computer may be used to relay accurate information for beamforming by the most proximal transmitting device.

A combination of both classical and quantum hybrid infrastructure may be used in some embodiments. Quantum computers assisting in such positioning and beamforming optimization may work in conjunction with classical (e.g., non-quantum) computers for optimal state forming and parametrization of the quantum bits that execute the quantum computations. The state of a qubit, as used in quantum computing, may define the information computed and carried. A single qubit can compute multiple computations in multiple energy configurations. The qubits may be prepared energetically, such that the computations are performed accurately and in a timely manner. In some embodiments, downsampled Kalman filtering may provide basal parameters for different locations and different times in advance to optimize the RF pulses within the superconducting quantum computer. For example, the basal signatures for different regions 100 and/or times may be different (e.g., based on locality factors discussed above). Some embodiments may provide accurate quantum RF pulse sequences required for regions 100 with different basal signatures for every location trained with the deep neural networks in a classical computing system. For example, UEs 101 and/or mobile base stations moving more rapidly may be associated with more frequent and/or stronger RF pulses than UEs 101 and/or mobile base stations that are moving less rapidly and/or are stationary. In another example, one geographical location at a given time with larger number of accounted factors to compute may require a different set of qubits at another time.

Figure 6:
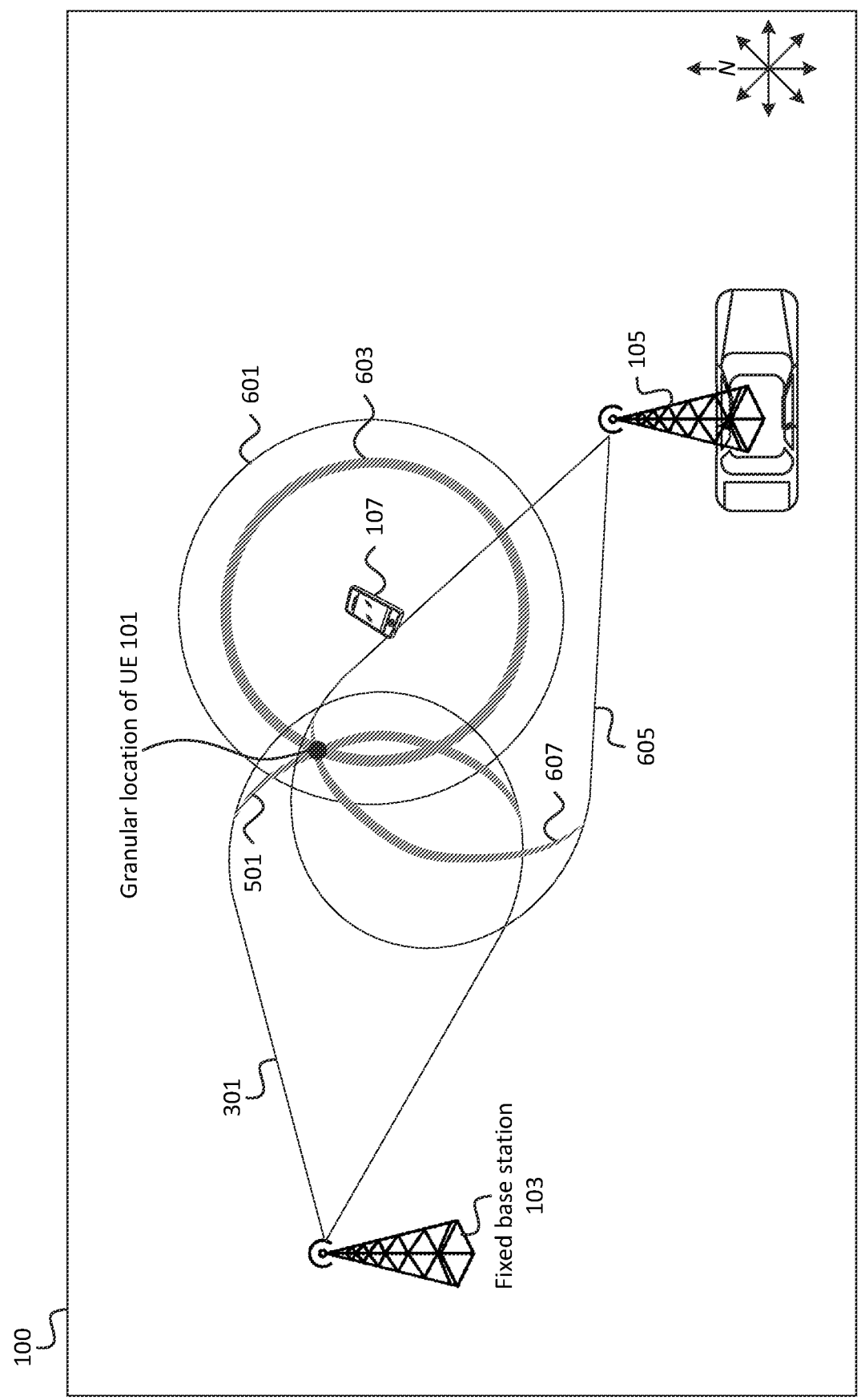
FIG. 6 illustrates an example determination of a granular location of a UE in a RAN that includes multiple types of base stations, including mobile base stations, in accordance with some embodiments.

ROS 113 may compute respective granular location regions with respect to multiple base stations, and may utilize such multiple granular location regions in order to determine a particular location of UE 101. For example, as shown in FIG. 6, UE 101 may be associated with granular location regions 501, 603, and 607, associated with fixed base station 103, UE 107, and mobile base station 105, respectively. For example, granular location region 501 may correspond to a portion of coverage area 301 associated with fixed base station 103, granular location region 603 may correspond to a portion of coverage area 601 associated with UE 107, and granular location region 607 may correspond to a portion of coverage area 605 associated with mobile base station 105. ROS 113 may, in some embodiments, determine that a point or region corresponding to an intersection of granular location regions 501, 605, and 607 is a granular location of UE 101.

Figure 7:
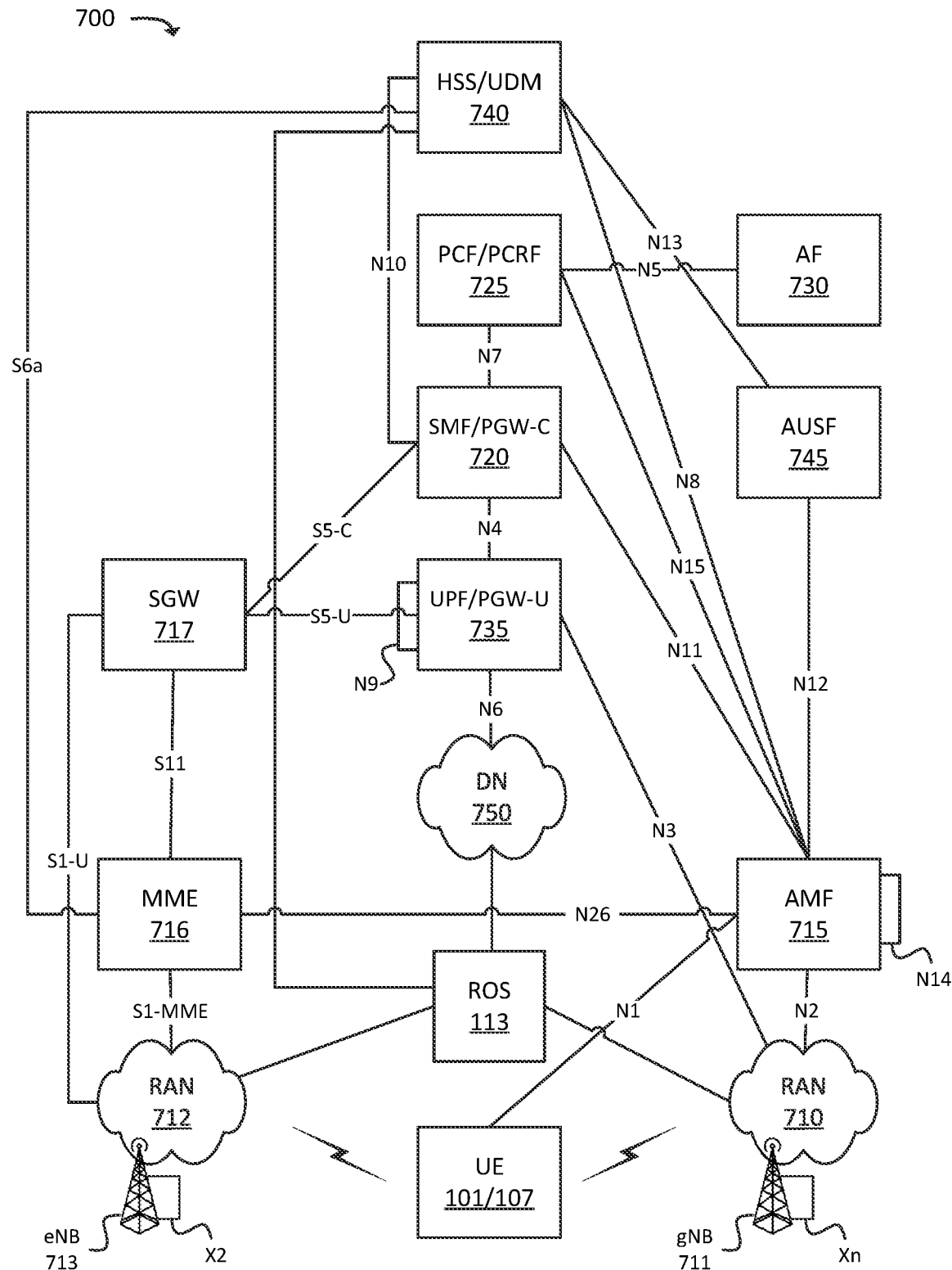
FIG. 7 illustrates an example environment in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 700 may include UE 701, RAN 710 (which may include one or more Next Generation Node Bs ("gNBs") 711), RAN 712 (which may include one or more one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Home Subscriber Server ("HSS")/Unified Data Management ("UDM") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750), such as ROS 113.

The example shown in FIG. 7 illustrates one instance of each network component or function (e.g., one instance of SMF/PGW-C 720, PCF/PCRF 725, UPF/PGW-U 735, HSS/UDM 740, and/or 745). In practice, environment 700 may include multiple instances of such components or functions. For example, in some embodiments, environment 700 may include multiple "slices" of a core network, where each slice includes a discrete set of network functions (e.g., one slice may include a first instance of SMF/PGW-C 720, PCF/PCRF 725, UPF/PGW-U 735, HSS/UDM 740, and/or 745, while another slice may include a second instance of SMF/PGW-C 720, PCF/PCRF 725, UPF/PGW-U 735, HSS/UDM 740, and/or 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 701 may include a computation and communication device, such as a wireless mobile communication device that is capable of communicating with RAN 710, RAN 712, and/or DN 750. UE 701 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an IoT device, a Mobile-to-Mobile ("M2M") device, or another type of mobile computation and communication device. UE 701 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 701 may communicate with one or more other elements of environment 700. UE 701 may communicate with RAN 710 via an air interface (e.g., as provided by gNB 711). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, AMF 715, and/or one or more other devices or networks) and may communicate the traffic to UE 701 via the air interface. In some embodiments, fixed base station 103 and/or mobile base station 105 may be, may include, and/or may be implemented by one or more gNBs 711.

RAN 712 may be, or may include, a LTE RAN that includes one or more base stations (e.g., one or more eNBs 713), via which UE 701 may communicate with one or more other elements of environment 700. UE 701 may communicate with RAN 712 via an air interface (e.g., as provided by eNB 713). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, SGW 717, and/or one or more other devices or networks) and may communicate the traffic to UE 701 via the air interface. In some embodiments, fixed base station 103 and/or mobile base station 105 may be, may include, and/or may be implemented by one or more eNBs 713.

AMF 715 may include one or more devices, systems, Virtualized Network Functions ("VNFs"), etc., that perform operations to register UE 701 with the 5G network, to establish bearer channels associated with a session with UE 701, to hand off UE 701 from the 5G network to another network, to hand off UE 701 from the other network to the 5G network, manage mobility of UE 701 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, etc., that perform operations to register UE 701 with the EPC, to establish bearer channels associated with a session with UE 701, to hand off UE 701 from the EPC to another network, to hand off UE 701 from another network to the EPC, manage mobility of UE 701 between RANs 712 and/or eNBs 713, and/or to perform other operations.

SGW 717 may include one or more devices, systems, VNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, etc., that gather, process, store, and/or provide information in a manner described herein. SMF/PGW-C 720 may, for example, facilitate in the establishment of communication sessions on behalf of UE 701. In some embodiments, the establishment of communications sessions may be performed in accordance with one or more policies provided by PCF/PCRF 725.

PCF/PCRF 725 may include one or more devices, systems, VNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, etc., that receive, store, and/or provide information that may be used in determining parameters (e.g., quality of service parameters, charging parameters, or the like) for certain applications.

UPF/PGW-U 735 may include one or more devices, systems, VNFs, etc., that receive, store, and/or provide data (e.g., user plane data). For example, UPF/PGW-U 735 may receive user plane data (e.g., voice call traffic, data traffic, etc.), destined for UE 701, from DN 750, and may forward the user plane data toward UE 701 (e.g., via RAN 710, SMF/PGW-C 720, and/or one or more other devices). In some embodiments, multiple UPFs 735 may be deployed (e.g., in different geographical locations), and the delivery of content to UE 701 may be coordinated via the N9 interface (e.g., as denoted in FIG. 7 by the line marked "N9" originating and terminating at UPF/PGW-U 735). Similarly, UPF/PGW-U 735 may receive traffic from UE 701 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 701.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 701 may communicate, through DN 750, with data servers, other UEs 701, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 701 may communicate.

ROS 113 may include one or more devices, systems, VNFs, etc., that perform one or more operations described herein. For example, ROS 113 may use quantum computing to determine a granular location of UE 101 based on information (e.g., RF metrics, signal propagation information, and/or other information) determined by and/or received from UE 101, one or more base stations (e.g., one or more fixed base stations 103 and/or one or more mobile base stations 105), one or more other UEs (e.g., UE 107), and/or other devices or systems. ROS 113 may communicate with gNB 711 and/or eNB 713 in order to perform one or more RAN configuration modifications based on the determined granular location of one or more UEs 101 (e.g., modifications to beamforming parameters and/or other suitable parameters).

Figure 8:
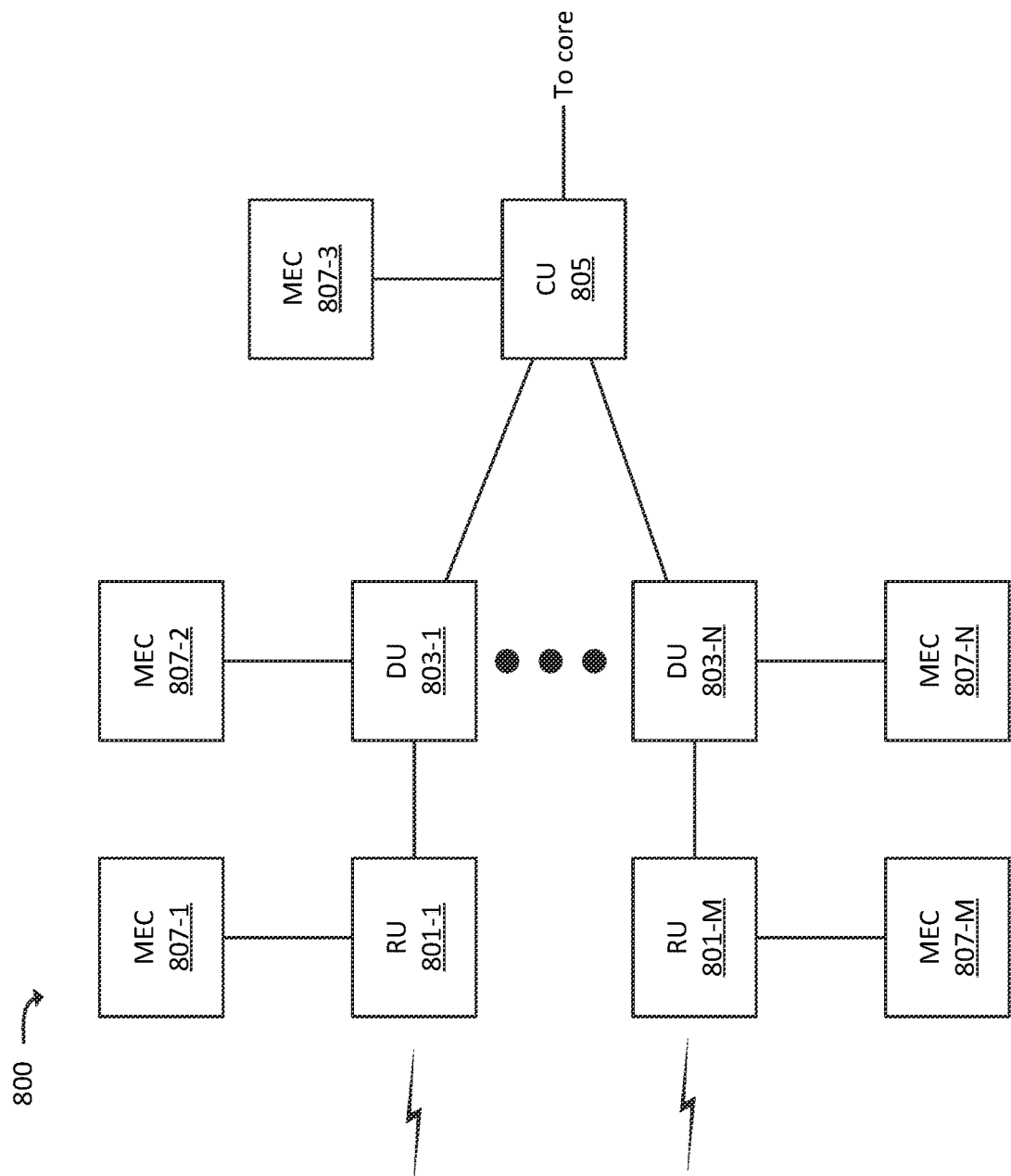
FIG. 8 illustrates an example arrangement of a radio access network ("RAN"), in accordance with some embodiments.

FIG. 8 illustrates an example Distributed Unit ("DU") network 800, which may be included in and/or implemented by one or more RANs (e.g., RAN 710, RAN 712, or some other RAN). In some embodiments, a particular RAN may include one DU network 800. In some embodiments, a particular RAN may include multiple DU networks 800. In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 701 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 701, and may determine which DU(s) 803 should receive the downlink traffic. DU 803 may include one or more devices that transmit traffic between a core network (e.g., via CU 805) and UE 701 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 701.

RU 801 may include hardware circuitry (e.g., one or more RF transceivers, antennas, radios, and/or other suitable hardware) to communicate wirelessly (e.g., via an RF interface) with one or more UEs 701, one or more other DUs 803 (e.g., via RUs 801 associated with DUs 803), and/or any other suitable type of device. In the uplink direction, RU 801 may receive traffic from UE 701 and/or another DU 803 via the RF interface and may provide the traffic to DU 803. In the downlink direction, RU 801 may receive traffic from DU 803, and may provide the traffic to UE 701 and/or another DU 803.

RUs 801 may, in some embodiments, be communicatively coupled to one or more MECs 807. For example, RU 801-1 may be communicatively coupled to MEC 807-1, RU 801-M may be communicatively coupled to MEC 807-M, DU 803-1 may be communicatively coupled to MEC 807-2, DU 803-N may be communicatively coupled to MEC 807-N, CU 805 may be communicatively coupled to MEC 807-3, and so on. MECs 807 may include hardware resources (e.g., configurable or provisionable hardware resources) that may be configured to provide services and/or otherwise process traffic to and/or from UE 701, via a respective RU 801.

For example, RU 801-1 may route some traffic, from UE 701, to MEC 807-1 instead of to a core network (e.g., via DU 803 and CU 805). MEC 807-1 may process the traffic, perform one or more computations based on the received traffic, and may provide traffic to UE 701 via RU 801-1. In this manner, ultra-low latency services may be provided to UE 701, as traffic does not need to traverse DU 803, CU 805, and an intervening backhaul network between DU network 800 and the core network. In some embodiments, MEC 807 may include, and/or may implement, some or all of the functionality described above with respect to ROS 113.

Figure 9:
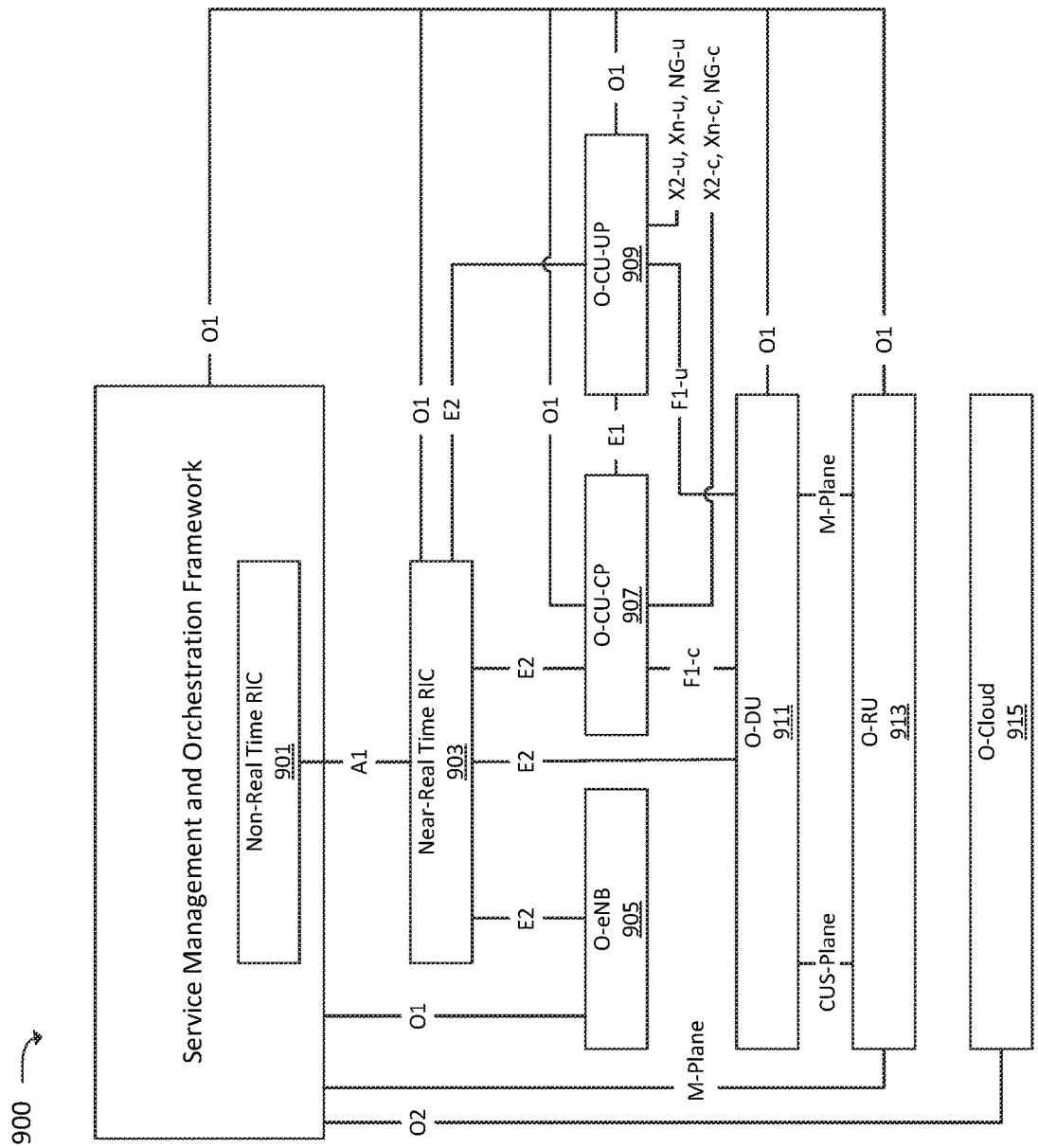
FIG. 9 illustrates an example arrangement of an Open RAN ("O-RAN") environment in which one or more embodiments, described herein, may be implemented.

FIG. 9 illustrates an example O-RAN environment 900, which may correspond to RAN 710, RAN 712, and/or DU network 800. For example, RAN 710, RAN 712, and/or DU network 800 may include one or more instances of O-RAN environment 900, and/or one or more instances of O-RAN environment 900 may implement RAN 710, RAN 712, DU network 800, and/or some portion thereof. As shown, O-RAN environment 900 may include Non-Real Time Radio Intelligent Controller ("RIC") 901, Near-Real Time RIC 903, O-eNB 905, O-CU-Control Plane ("O-CU-CP") 907, O-CU-User Plane ("O-CU-UP") 909, O-DU 911, O-RU 913, and O-Cloud 915. In some embodiments, O-RAN environment 900 may include additional, fewer, different, and/or differently arranged components.

In some embodiments, some or all of the elements of O-RAN environment 900 may be implemented by one or more configurable or provisionable resources, such as virtual machines, cloud computing systems, physical servers, and/or other types of configurable or provisionable resources. In some embodiments, some or all of O-RAN environment 900 may be implemented by, and/or communicatively coupled to, one or more MECs 807.

Non-Real Time RIC 901 and Near-Real Time RIC 903 may receive performance information (and/or other types of information) from one or more sources, and may configure other elements of O-RAN environment 900 based on such performance or other information. For example, Near-Real Time RIC 903 may receive performance information, via one or more E2 interfaces, from O-eNB 905, O-CU-CP 907, and/or O-CU-UP 909, and may modify parameters associated with O-eNB 905, O-CU-CP 907, and/or O-CU-UP 909 based on such performance information. Similarly, Non-Real Time RIC 901 may receive performance information associated with O-eNB 905, O-CU-CP 907, O-CU-UP 909, and/or one or more other elements of O-RAN environment 900 and may utilize machine learning and/or other higher level computing or processing to determine modifications to the configuration of O-eNB 905, O-CU-CP 907, O-CU-UP 909, and/or other elements of O-RAN environment 900. In some embodiments, Non-Real Time RIC 901 may generate machine learning models based on performance information associated with O-RAN environment 900 or other sources, and may provide such models to Near-Real Time RIC 903 for implementation.

O-eNB 905 may perform functions similar to those described above with respect to eNB 713. For example, O-eNB 905 may facilitate wireless communications between UE 701 and a core network. O-CU-CP 907 may perform control plane signaling to coordinate the aggregation and/or distribution of traffic via one or more DUs 803, which may include and/or be implemented by one or more O-DUs 911, and O-CU-UP 909 may perform the aggregation and/or distribution of traffic via such DUs 803 (e.g., O-DUs 911). O-DU 911 may be communicatively coupled to one or more RUs 801, which may include and/or may be implemented by one or more O-RUs 913. In some embodiments, O-Cloud 915 may include or be implemented by one or more MECs 807, which may provide services, and may be communicatively coupled, to O-CU-CP 907, O-CU-UP 909, O-DU 911, and/or O-RU 913 (e.g., via an O1 and/or O2 interface).

Figure 10:
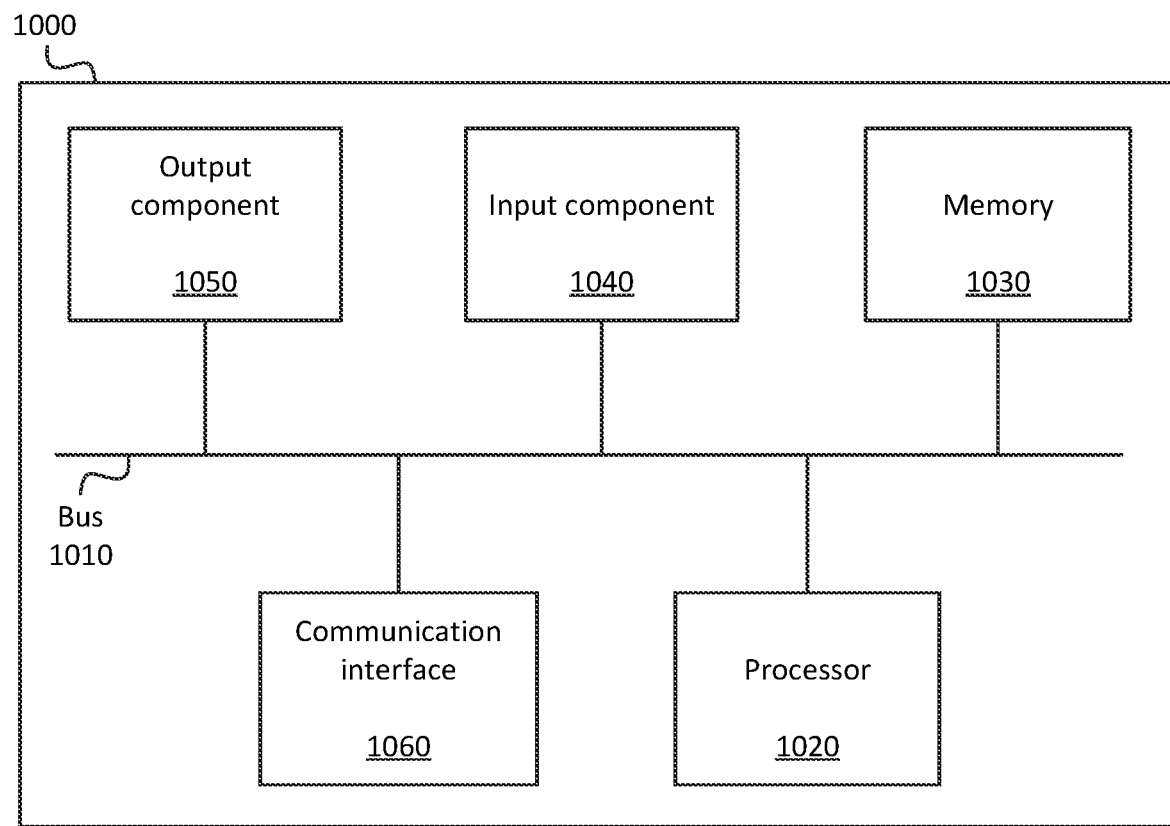
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors to:
   receive radio frequency ("RF") metrics associated with a User Equipment ("UE") and a mobile base station;
   determine a set of parameters of quantum computing radio frequency ("RF") pulses based on a velocity of the mobile base station;

compute a distance between the UE and the mobile base station based on:
the RF metrics associated with the UE and the mobile base station,
the set of parameters of quantum RF pulses determined based on the velocity of the mobile base station; and
modify one or more parameters of the mobile base station based on the computed distance between the UE and the mobile base station.

2. The device of claim 1, wherein the one or more processors are further configured to:
compute a location of the UE based on:
the distance between the UE and the mobile base station, and
a location of the mobile base station.

3. The device of claim 1, wherein the UE is a first UE, wherein the mobile base station is implemented by a second UE.

4. The device of claim 1, wherein the RF metrics include a delay time associated with a set of RF signals sent from the mobile base station to the UE.

5. The device of claim 1, wherein modifying the one or more parameters of the mobile base station include modifying one or more beamforming parameters of the mobile base station based on the computed distance of the UE from the mobile base station, the one or more beamforming parameters including at least one of:
an azimuth angle associated with one or more antennas of the mobile base station,
a tilt angle associated with the one or more antennas of the mobile base station, or
a transmit power associated with the one or more antennas of the mobile base station.

6. The device of claim 1, wherein the mobile base station is a first mobile base station, wherein the set of parameters of quantum computing RF pulses are a first set of parameters of quantum computing pulses, wherein the one or more processors are further configured to:
determine a second set of quantum computing RF pulses based on a velocity of a second mobile base station; and
compute a distance between the UE and the second mobile base station based on the second set of quantum computing RF pulses.

7. The device of claim 6, wherein the velocity of the first mobile base station is higher than the velocity of the second mobile base station, wherein the first set of quantum RF pulses are stronger than the second set of quantum RF pulses based on the velocity of the first mobile base station being higher than the velocity of the second mobile base station.

8. A non-transitory computer-readable medium storing a plurality of processor-executable instructions to:
receive radio frequency ("RF") metrics associated with a User Equipment ("UE") and a mobile base station;
determine a set of parameters of quantum computing radio frequency ("RF") pulses based on a velocity of the mobile base station;
compute a distance between the UE and the mobile base station based on:
the RF metrics associated with the UE and the mobile base station,
the set of parameters of quantum RF pulses determined based on the velocity of the mobile base station; and
modify one or more parameters of the mobile base station based on the computed distance between the UE and the mobile base station.

9. The non-transitory computer-readable medium of claim 8, wherein the plurality of processor-executable instructions further include processor-executable instructions to:
compute a location of the UE based on:
the distance between the UE and the mobile base station, and
a location of the mobile base station.

10. The non-transitory computer-readable medium of claim 8, wherein the UE is a first UE, wherein the mobile base station is implemented by a second UE.

11. The non-transitory computer-readable medium of claim 8, wherein the RF metrics include a delay time associated with a set of RF signals sent from the mobile base station to the UE.

12. The non-transitory computer-readable medium of claim 8, wherein modifying the one or more parameters of the mobile base station include modifying one or more beamforming parameters of the mobile base station based on the computed distance of the UE from the mobile base station, the one or more beamforming parameters including at least one of:
an azimuth angle associated with one or more antennas of the mobile base station,
a tilt angle associated with the one or more antennas of the mobile base station, or
a transmit power associated with the one or more antennas of the mobile base station.

13. The non-transitory computer-readable medium of claim 8, wherein the mobile base station is a first mobile base station, wherein the set of parameters of quantum computing RF pulses are a first set of parameters of quantum computing pulses, wherein the plurality of processor-executable instructions further include processor-executable instructions to:
determine a second set of quantum computing RF pulses based on a velocity of a second mobile base station; and
compute a distance between the UE and the second mobile base station based on the second set of quantum computing RF pulses.

14. The non-transitory computer-readable medium of claim 13, wherein the velocity of the first mobile base station is higher than the velocity of the second mobile base station, wherein the first set of quantum RF pulses are stronger than the second set of quantum RF pulses based on the velocity of the first mobile base station being higher than the velocity of the second mobile base station.

15. A method, comprising:
receiving radio frequency ("RF") metrics associated with a User Equipment ("UE") and a mobile base station;
determining a set of parameters of quantum computing radio frequency ("RF") pulses based on a velocity of the mobile base station;
computing a distance between the UE and the mobile base station based on:
the RF metrics associated with the UE and the mobile base station,
the set of parameters of quantum RF pulses determined based on the velocity of the mobile base station; and
modifying one or more parameters of the mobile base station based on the computed distance between the UE and the mobile base station.

16. The method of claim 15, further comprising:
computing a location of the UE based on:
the distance between the UE and the mobile base station, and
a location of the mobile base station.

17. The method of claim 15, wherein the UE is a first UE, wherein the mobile base station is implemented by a second UE.

18. The method of claim 15, wherein the RF metrics include a delay time associated with a set of RF signals sent from the mobile base station to the UE.

19. The method of claim 15, wherein modifying the one or more parameters of the mobile base station include modifying one or more beamforming parameters of the mobile base station based on the computed distance of the UE from the mobile base station, the one or more beamforming parameters including at least one of:
- an azimuth angle associated with one or more antennas of the mobile base station,
- a tilt angle associated with the one or more antennas of the mobile base station, or
- a transmit power associated with the one or more antennas of the mobile base station.

20. The method of claim 15, wherein the mobile base station is a first mobile base station, wherein the set of parameters of quantum computing RF pulses are a first set of parameters of quantum computing pulses, the method further comprising:
- determining a second set of quantum computing RF pulses based on a velocity of a second mobile base station, wherein the velocity of the first mobile base station is higher than the velocity of the second mobile base station, wherein the first set of quantum RF pulses are stronger than the second set of quantum RF pulses based on the velocity of the first mobile base station being higher than the velocity of the second mobile base station; and
- computing a distance between the UE and the second mobile base station based on the second set of quantum computing RF pulses.

* * * * *